United States Patent [19]

Mitchell

[11] 4,305,098
[45] Dec. 8, 1981

[54] APPARATUS FOR RECORDING TELEVISION IMAGES ON CINE FILM

[75] Inventor: Philip J. Mitchell, Farnborough, England

[73] Assignee: The Secretary of State for Defence in Her Britannic Majesty's Government of the United Kingdom of Great Britain and Northern Ireland, London, England

[21] Appl. No.: 70,386

[22] Filed: Aug. 28, 1979

[51] Int. Cl.$^3$ ............................................. H04N 5/86
[52] U.S. Cl. .................................... 358/131; 358/244
[58] Field of Search ................ 358/244, 130, 132, 131

[56] References Cited

U.S. PATENT DOCUMENTS

| | | | |
|---|---|---|---|
| 2,251,786 | 8/1941 | Epstein | 358/131 |
| 2,329,624 | 9/1943 | Kellogg | 358/131 |
| 2,414,319 | 1/1947 | Milholland | 358/131 |
| 3,317,663 | 5/1967 | Van Dam | 358/244 |
| 3,723,647 | 3/1973 | John, Jr. | 358/131 |

Primary Examiner—Bernard Konick
Assistant Examiner—Donald McElheny, Jr.
Attorney, Agent, or Firm—Pollock, Vande Sande & Priddy

[57] ABSTRACT

An apparatus for transferring television pictures onto cine film which operates independent of field scan frequency and which synchronizes each frame of the cine film with the television field scans to avoid the appearance of a bar across each frame. The apparatus comprises a cine camera which in operation is placed in front of a television screen and which generates a shutter opening signal, a control unit which synchronizes that signal with the video signal to the television such that the shutter opens at the beginning of a field scan, and a motor drive unit which utilizes the video signal to drive the camera shutter blade at one third the field scan frequency. The apparatus is useful for transferring television field scans operating at any frequency onto cine film.

4 Claims, 3 Drawing Figures

APPARATUS FOR RECORDING TELEVISION IMAGES ON CINE FILM

BACKGROUND OF THE INVENTION

This invention relates to the transfer of television pictures onto cine film.

Hitherto the process of transferring television pictures onto cine film has been carried out using a free running cine camera which films from the television screen. Such a process is often preferred to that of recording onto video tape, since cine film is more readily edited and facilitates the projection of larger images as required in lecture threatres and cinemas. However in the filming process a problem arises because the blanking time of the television field scan, which is in the order of 2 milliseconds, is far less than the pull-down time for each cine frame of conventional cine cameras, which is typically in excess of 20 milliseconds. This results in an arbitrary overlapping of the television fields recorded by the camera and is seen as a light or dark horizontal bar which moves up or down the film record depending on the relationship between the camera speed and television field frequency. To overcome this problem on a field scan operating at mains frequency, cine cameras on a mains supply have been modified to operate at 16⅔ frames per second, and to film only two field scans out of every three. The period of the omitted scan is used to provide the pull-down time for the cine camera.

The above process is unsuitable for field scans operating at other than mains frequency and also produces a shadowy black bar extending horizontally across each frame of cine film; this occurs because the time at which the camera shutter opens is not coincident with the beginning of a field scan.

SUMMARY OF THE INVENTION

According to the present invention a television recording apparatus for transferring television pictures onto cine film comprises:

a cine camera adapted in operation to generate a pulse signal upon each opening of its shutter;

a synchronization means adapted in operation to receive the pulse signal and to synchronize that signal with a video field signal to a television screen, such that the camera shutter opens at the beginning of a field scan on the television screen; a motor drive means which in operation utilizes the video signal to drive the camera motor, at a rate whereby the frequency of shutter opening is one third that of the video signal. Preferably the shutter remains open for two thirds of its cycle of operation.

According to a feature of the present invention the pulse signal from the cine camera is generated from a transducer activated by the shutter blade of the camera. In a preferred form of the present invention the transducer is a photo-electric trigger.

According to a further feature of the present invention the synchronization means includes a comparator which receives the pulse signal and a field pulse signal, and which operates a phase shift unit until the pulse signal and the field pulse signal are synchronized. Preferably the synchronization means also includes a manual phase shift unit and a synchronization indicator.

BRIEF DESCRIPTION OF THE DRAWINGS

A recording apparatus in accordance with the present invention will now be described by way of example with reference to the following drawings of which.

DESCRIPTION OF THE PREFERRED EMBODIMENT

Figure 1:
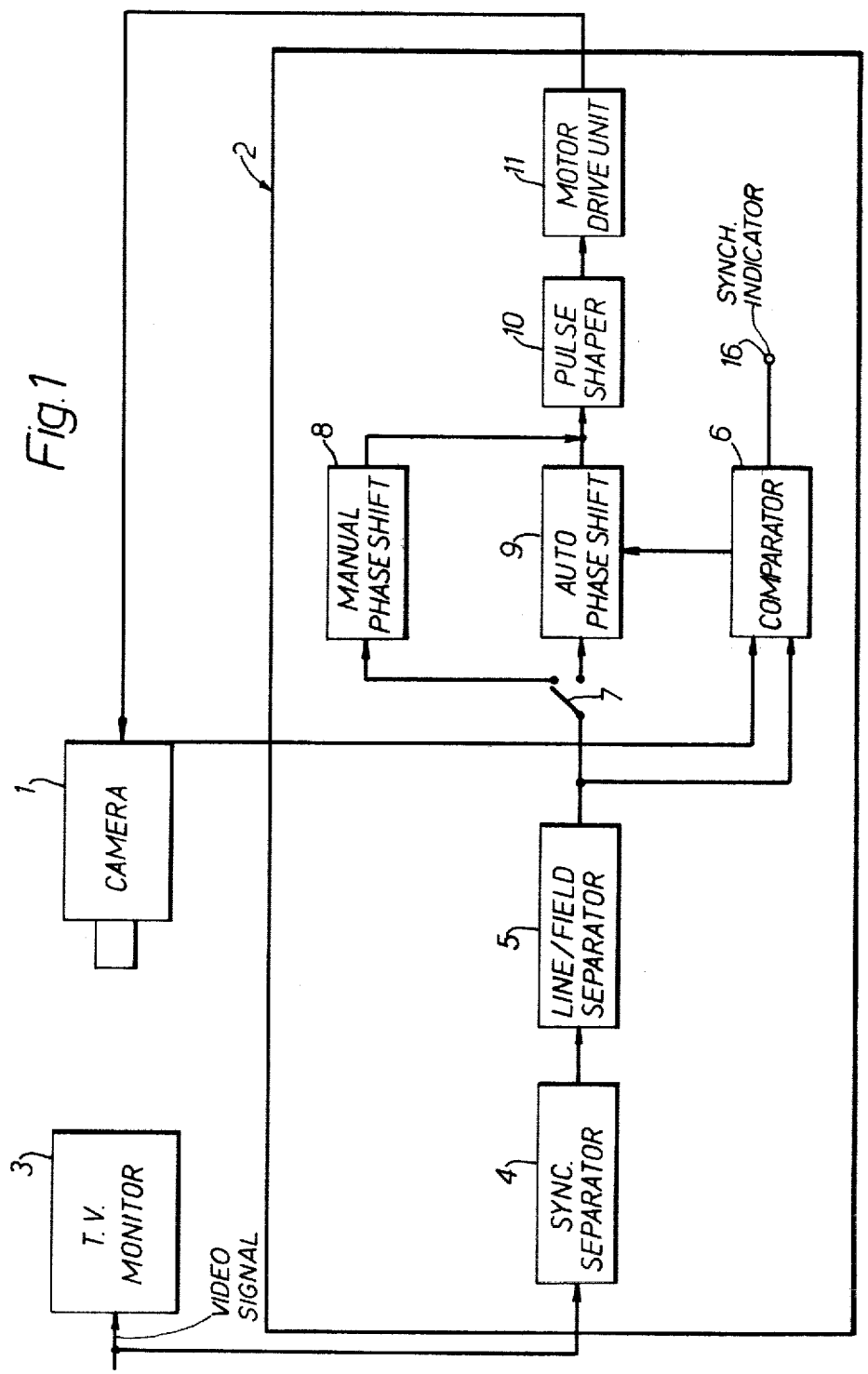
FIG. 1 shows a block diagram of the apparatus operating with respect to a television monitor.

Referring to FIG. 1 the recording apparatus comprises a cine camera 1 and a control unit 2 which is adapted to receive a video signal from a television monitor 3.

The control unit 2 includes a synchronization separator 4 which receives the video signal and has its output connected to the input of a line and field separator 5. The output of the line and field separator 5 is directed to a first input of a comparator 6, and to a two way switch 7. The switch 7 directs the output from the line and field separator 5 to the input of either the manual phase shift unit 8 or the automatic phase shift unit 9. The output from either of the phase shift units 8 or 9, is received by a pulse shaper 10 having an output to a motor drive unit 11 which provides the drive signal to the camera motor.

Figure 2:
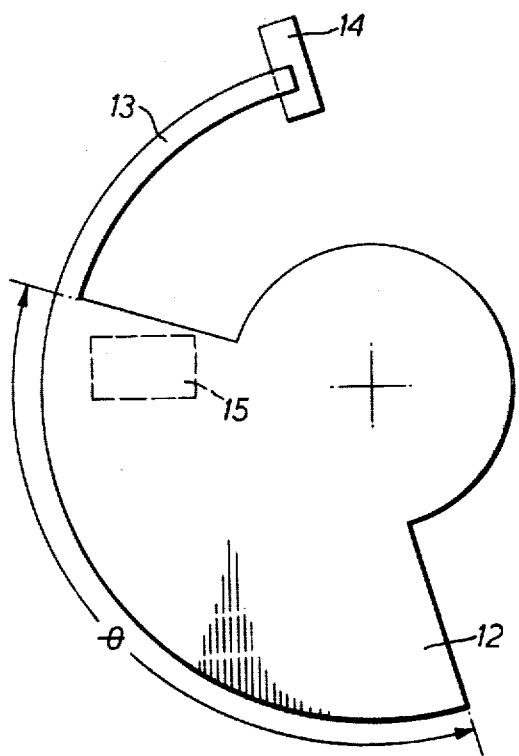
FIG. 2 shows the pulse signalling mechanism of the cine camera.

As can be seen from FIG. 2 a shutter blade 12 of the camera 1 extends acros an angle of θ of 120°, and includes an arcuate extension 13 which is used to activate a photo-electric trigger 14 on the opening of the camera film gate 15. The output of the photo-electric trigger 14 is connected to a second input of the comaprator 6. The comparator 6 has a first output which is fed to the automatic phase shift unit 9 and a second output which is connected to a synchronization indicator 16.

Figure 3:
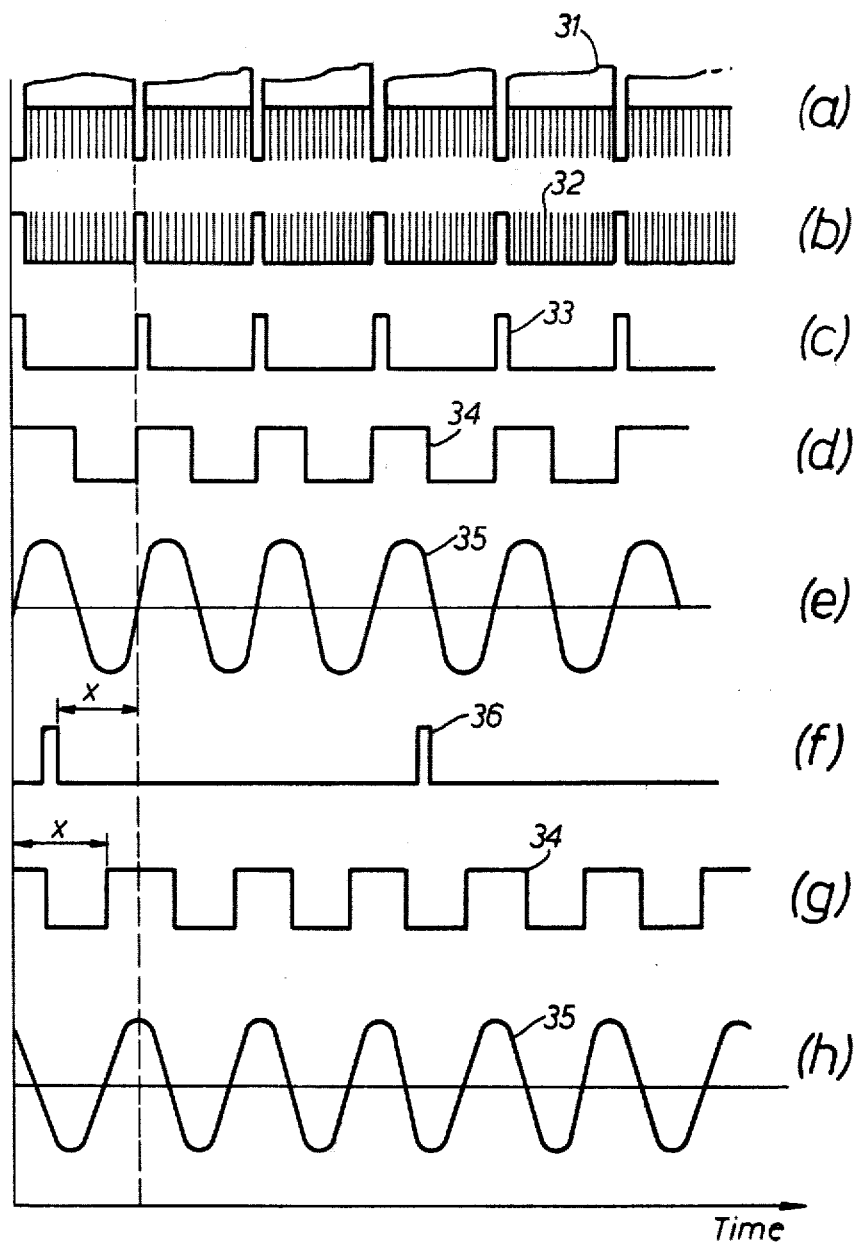
FIG. 3 shows the waveforms generated on operation of the recording apparatus.

In operation of the recording apparatus the camera 1 is directed towards the screen of the television monitor 3, and the input to the control unit 2 is connected to the television monitor 3 to receive a video signal 31 which is shown in FIG. 3a.

The video signal 31 is received by the synchronization separator 4 and converted into a line and field signal 32 as shown in FIG. 3b. On passing through the line and field separator 5 the line and field signal 32 emerges as a field pulse signal 33, shown in FIG. 3c.

The field pulse signal 33 is fed to the first input of the comparator 6, and also to the pulse shaper 10 after passing through either the manual phase shift unit 8 or the automatic phase shift unit 9 according to the position of the switch 7.

Once received by the pulse shaper 10 the field pulse signal 33 is then transmitted to the motor drive unit 11 as a 1:1 mark to space square wave 34, shown in FIG. 3d. The motor drive unit 11 amplifies the square wave 34 and converts it to a 240 volts RMS sine wave 35 as shown in FIG. 3e. The sine wave 35 is used to drive the motor of the camera 1 so that, by means of suitable gearing, the rotational frequency of the shutter is one third the frequency of the video signal.

As a result of the above, three field scans appear on the screen of the monitor 3 for each rotation of the shutter blade 12. Because the angle θ of the shutter blade 12 is 120° the exposure time of the cine film is equivalent to the period for the blade to rotate through 240° which equates with the period for two field scans to appear across the screen of the monitor 3. Hence for each rotation of the shutter blade 12 two field scans are recorded on a single frame of cine film.

Upon clockwise rotation of the shutter blade 12, the arcuate extension 13 actuates the photo-electric trigger 14 as the trailing edge of the blade 12 aligns with the upper edge of the film gate 15. Thus for each rotation of the shutter blade 12 a pulse signal 36 is produced. This pulse signal 36, which has a phase error of 'X' milliseconds with respect to the field pulse signal 33, is shown in FIG. 3f, and is received by the second input of the comparator 6.

Using the manual phase shift unit 8 the field pulse signal 33 is advanced by 'X' milliseconds so that the field pulse signal 33 and the pulse signal 36 becomes synchronized. Correct adjustment is observed on the synchronization indicator 16. Upon correct adjustment, the square wave 34 is advanced by 'X' milliseconds as shown in FIG. 3g, with the consequent advance of sine wave 35 by the same period, as shown in FIG. 3h. The advance of the sine wave 35 results in a corresponding angular advance of the shutter blade 12 such that it opens on every third pulse of the field pulse signal 33. In such circumstances the shutter opening coincides with the beginning of a video scan and the appearance of the bar across each frame of the cine film is thus avoided.

When the switch 7 is closed for the automatic phase shift unit 9 to be in circuit, the comparator 6 registers the phase difference between the field pulse signal 33 and the pulse signal 36 and feeds a corresponding signal to the unit 9. The automatic phase shift unit then advances the field pulse signal 33 until the phase difference between that signal and the pulse signal 36 is zero.

I claim:

1. A television recording apparatus for effecting a synchronized transfer of television pictures appearing on a television screen onto cine film in step with the field scan frequency of said television picture, said recording apparatus comprising:

a cine camera having a shutter, said cine camera including means operable to generate a pulse signal upon each opening of said shutter;

means responsive to a video signal which is fed to a television screen for deriving a signal at the field scan frequency of said video signal;

motor drive means for driving the said shutter at a rate proportional to the frequency of said video field scan signal;

synchronization means jointly responsive to said pulse signal and to said field scan frequency signal, said synchronization means including a comparator having a pair of inputs connected to receive said pulse signal and said field scan frequency signal respectively, a manual phase shift unit having an input connected to receive said field scan frequency signal, and a synchronization indicator, the output of said comparator being connected to said synchronization indicator so that the said manual phase shift unit can be manually adjusted in accordance with the display of the said indicator until said pulse signal and said field scan signal are synchronized when the camera shutter opens at the beginning of a field scan; and means coupling the output of said manual phase shift unit to said motor drive means.

2. A television recording apparatus as claimed in claim 1 and wherein said shutter is operative to open for two thirds of each cycle of said shutter operation.

3. A television recording apparatus as claimed in claim 1 and wherein said camera includes a photo-electric trigger which is activated by said shutter to produce said pulse signal.

4. The television recording apparatus of claim 1 including an automatic phase shift unit having a control input which is coupled to said comparator and having an output which is coupled to said motor drive means, and switch means for coupling said field scan frequency signal to the input of a selected one of said manual and automatic phase shift units.

* * * * *